(No Model.)

D. N. BUTTERFIELD.
STONE WAGON.

No. 555,673. Patented Mar. 3, 1896.

Witnesses:
Jas. P. Maloney.
H. J. Livermore.

Inventor,
David N. Butterfield,
by Jos. P. Livermore
Att'y.

UNITED STATES PATENT OFFICE.

DAVID N. BUTTERFIELD, OF NEW BOSTON, NEW HAMPSHIRE.

STONE-WAGON.

SPECIFICATION forming part of Letters Patent No. 555,673, dated March 3, 1896.

Application filed March 18, 1895. Serial No. 542,122. (No model.)

*To all whom it may concern:*

Be it known that I, DAVID N. BUTTERFIELD, of New Boston, county of Hillsborough, State of New Hampshire, have invented an Improvement in Stone-Wagons, of which the following description, in connection with the accompanying drawings, is a specification, like letters on the drawings representing like parts.

The present invention relates to vehicles and is embodied in an improved vehicle intended especially for hauling stone, lumber, &c., in the country where facilities for loading and unloading are not readily accessible.

The apparatus embodying the present invention combines the advantages in facility of loading and unloading of the ordinary drag with those of a wheeled vehicle in transmission when loaded. To attain these ends a truck is provided mounted upon wheels in the ordinary way, preferably having the front axle readily detachable therefrom for a purpose to be hereinafter described. A detachable carrier for the load is also provided consisting of a flat platform which can be placed upon the ground so that the stone or whatever is to be carried can easily be rolled upon it, and means are provided for attaching the said platform to the truck and hoisting the same from the ground so that it is suspended therefrom and thus becomes a part of the vehicle. Thus the carrier can be placed on the ground near the material which is to be moved, the material being placed thereon substantially without being lifted from the ground and the truck then brought up into position over the carrier, the main portion of the truck being, if desired, brought up separately from the front axles thereof, and after the truck is in place the carrier is attached thereto and hoisted from the ground.

Figure 1:
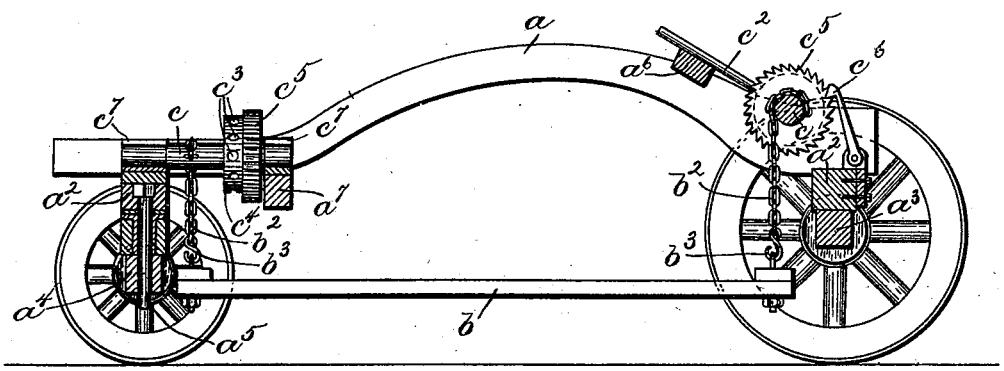
Figure 2:
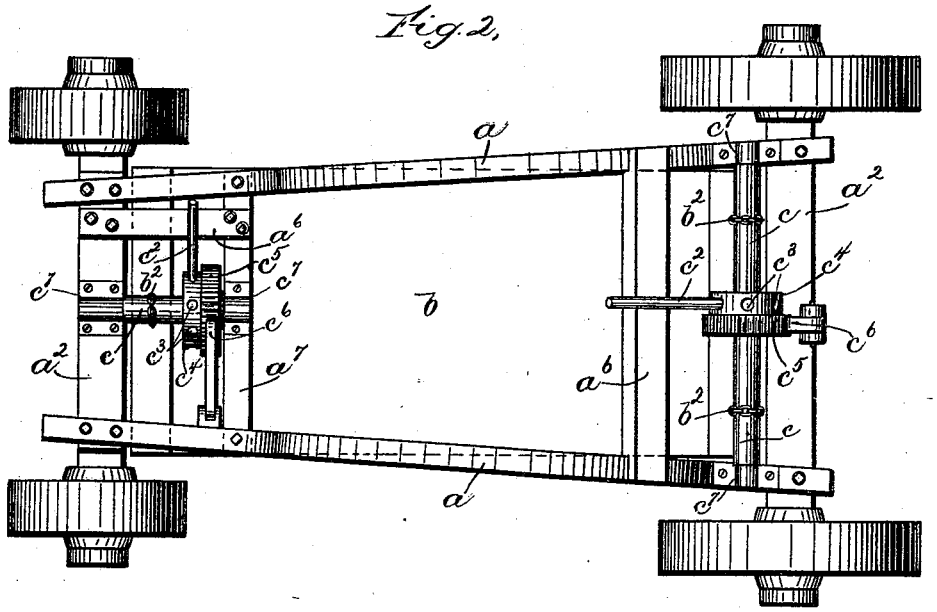

Figure 1 is a sectional elevation of the apparatus, and Fig. 2 a top plan view thereof.

As herein shown the truck is constructed in the form of an open framework having longitudinal side portions $a$, mounted at their ends upon the cross-bars $a^2$, the said cross-bars being supported respectively upon the rear and front axles, $a^3$ and $a^4$, the latter being secured by the king-pin $a^5$, Fig. 1, in the ordinary way. To support the load a carrier $b$, consisting of a flat platform, is suspended from the truck by means of chains or cables $b^2$, the said chains preferably being readily detachable from the said platform as by hooks $b^3$, co-operating with staples in the said platform, as shown.

When it is desired to move a load of stone, for example, the carrier $b$ is placed upon the ground as near as possible to the stone and the stone then rolled or pried thereon, after which the truck is brought up into position over the said carrier, the front axle and the main portion of the truck being, if desired, brought up separately in order to facilitate the positioning of the truck directly over the load, and the cables $b^2$ are then secured to the ends of the carrier. In order to hoist the carrier from the ground, after it is thus secured to the truck, the cables $b^2$ are connected to windlasses $c$, one at each end of the truck, and the said windlasses are provided with lever-arms $c^2$ radial to their axes, for turning said windlasses and winding the cables $b^2$ thereon, thus hoisting the carrier and its load from the ground. The levers $c^2$ are preferably detachable from the windlasses and, as shown herein, are simply thrust endwise into holes $c^3$ in the periphery of hubs $c^4$ upon said windlasses.

In order to facilitate the operation of hoisting the load, the windlasses are each provided with a ratchet-surface $c^5$ and pawls $c^6$, which serve to prevent the cables from unwinding when during the hoisting operation it is necessary to transfer a lever from one of the holes to another. After the load is hoisted, however, it is preferably supported by the lever itself engaging with a portion of the truck, such as a cross-bar $a^6$, thus relieving the pawl of the strain.

As shown herein the rear double windlass is transversely mounted in bearings upon the side portions $a$, and is provided with two chains, one for each of the rear corners of the carrier. The front windlass on the other hand extends longitudinally from the front cross-bar, $a^2$, to an additional cross-bar, $a^7$, parallel thereto, and is provided with only one chain attached to the center of the front portion of the carrier.

It will be observed that by arranging the front windlass longitudinally of the truck it may be conveniently operated from the side of the truck, no matter where the power be applied, and thus the operator will not be obstructed by the draft-gear and draft animals. It will also be observed that by arranging the front windlass longitudinally of the truck, I am enabled to use a single chain, and the chain in winding and traveling upon the windlass will retain its center of gravity longitudinally with relation to the platform or carrier and thereby prevent the carrier from swinging transversely, and thus preserving the position of the carrier with relation to the truck in hoisting.

The windlasses are preferably supported in open bearing-pockets $c^7$, there being no need of an upper bearing-surface since the weight of the load will be sufficient to hold them seated when in use. The whole apparatus may be simply and inexpensively constructed, and by its operation greatly facilitates the transportation of stone, lumber, &c., which is now commonly either loaded with great difficulty upon wheeled vehicles or transported upon drags which require great hauling power to move them. It is obvious, moreover, that the operation of unloading is as much simplified by the use of this apparatus as that of loading.

I claim—

The combination of a truck mounted upon axles and detachably secured to one of said axles as by a king-pin, a double windlass arranged transversely of the truck at the rear thereof and carrying two chains, a windlass arranged longitudinally of the truck at the front thereof and carrying a single chain, a carrier consisting of a separate platform adapted to be detachably connected to said chains, and independent means for operating said windlasses, substantially as described.

In testimony whereof I have signed my name to this specification in the presence of two subscribing witnesses.

DAVID N. BUTTERFIELD.

Witnesses:
H. J. LIVERMORE,
M. E. HILL.